Figure 1:
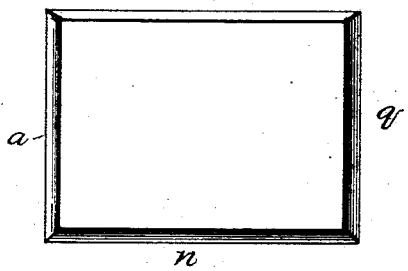

(No Model.) 2 Sheets—Sheet 1.

F. W. STARR.
FASTENING DEVICE.

No. 525,748. Patented Sept. 11, 1894.

Witnesses
Victor J. Evans.
L. M. Marble

Inventor
Ferdinand W. Starr
by E. M. Marble Sons
Attorneys (No Model.) 2 Sheets—Sheet 2.
F. W. STARR.
FASTENING DEVICE.
No. 525,748. Patented Sept. 11, 1894.
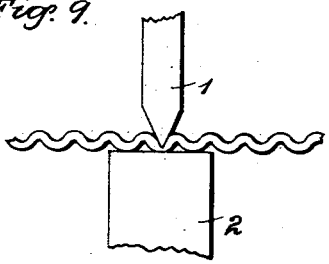
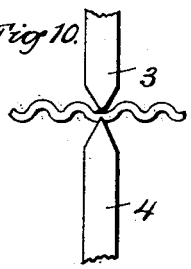
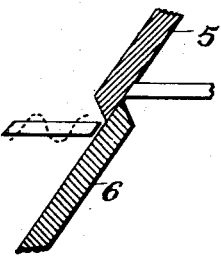
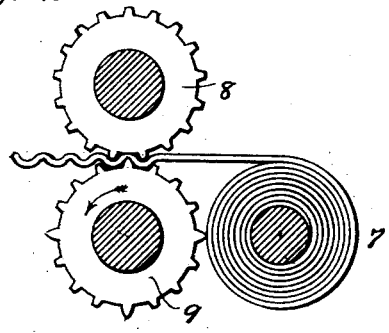
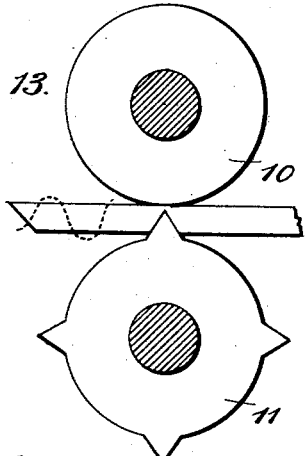
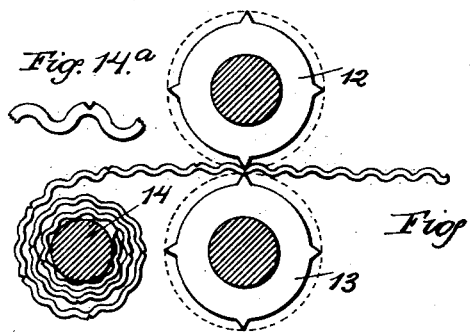
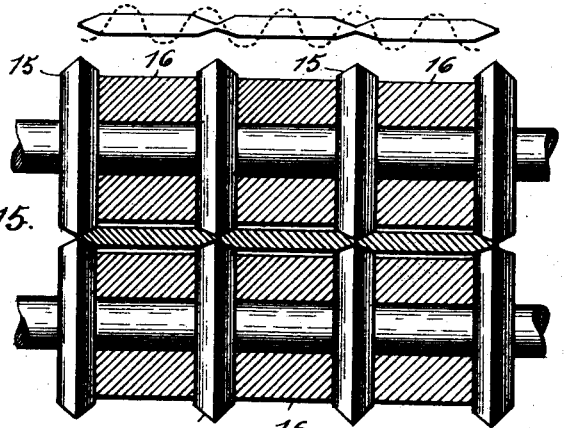
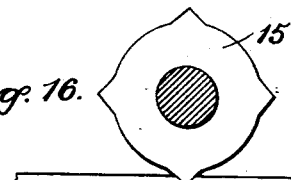
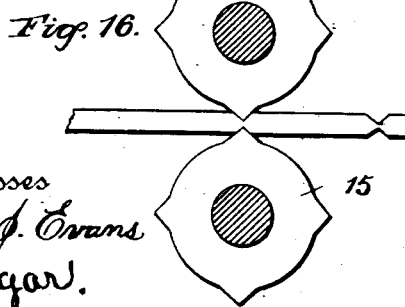
Witnesses
Victor J. Evans
M. Apgar
Inventor
Ferdinand W. Starr
by E. W. Marble & Son,
Attorneys

UNITED STATES PATENT OFFICE.

FERDINAND W. STARR, OF SPRINGFIELD, OHIO.

FASTENING DEVICE.

SPECIFICATION forming part of Letters Patent No. 525,748, dated September 11, 1894.

Application filed February 5, 1890. Renewed March 26, 1894. Serial No. 505,195. (No model.)

*To all whom it may concern:*

Be it known that I, FERDINAND W. STARR, a citizen of the United States, residing in Springfield, in the county of Clark and State of Ohio, have invented certain new and useful Improvements in Metallic Fastening Devices and Methods of Making the Same; and I do declare the following to be a full, clear, and exact description of the invention, such as will enable others skilled in the art to which it appertains to make and use the same.

My invention relates to improvements in corrugated fasteners, and it consists in an improved corrugated fastener, whose driving, cutting and holding qualities are increased by the formation of the fastener with sharpened side edges, and with an entering edge having straight cutting edges alternating with draw-cutting edges, which will be hereinafter fully described and particularly pointed out in the claims.

Heretofore I have made several improvements in the art of corrugated metallic fasteners, disclosing in Patent No. 396,900, granted to me on January 9, 1889, a fastener having a corrugated body portion and a sharpened edge; in Patent No. 406,545, granted to me on July 9, 1889, a corrugated fastener whose entering edge is composed of re-entering draw-cutting edges intermediate between points; and in Patent No. 419,375, granted to me on January 14, 1890, a corrugated fastener having irregular side edges and a sharpened entering edge. One of the constant aims of my improvements has been to improve the penetrating qualities of corrugated metallic fasteners, it being necessary, on account of the length of the entering edge of the fasteners, to render as easy as possible their entrance into the article into which they are driven. To this end I have paid special attention to the form of the entering edge.

My present improvement has for its aim to so form a corrugated fastener as to enable it to be more easily driven, and to increase its cutting and holding qualities; and it consists, first, in forming the fastener with sharpened side edges; and, second, in forming the edge of the fastener with re-entering, draw-cutting edges intermediate between straight cutting edges. Practical tests have shown that the sharpening of the side edge of a fastener enables the same to be more easily driven, as the sharpened side edges separate the fibers of the article into which the fastener is driven, thus forming in effect, an additional cutting edge, and do not render necessary the violent rupture of the fiber which is caused by blunt side edges. They also enable the fastener to be driven across the grain of the goods without splintering or fracturing the same. The form of entering edge which I now use is a good cutting edge, combining as it does the advantage of a straight cutting edge with that of a draw shear cutting edge, and facilitates the entrance of the fastener into the wood.

My invention is fully illustrated in the drawings accompanying and forming a part of this application, in which the same reference letters and numerals refer to the same or corresponding parts, and in which—

Figure 2:
Figure 3:
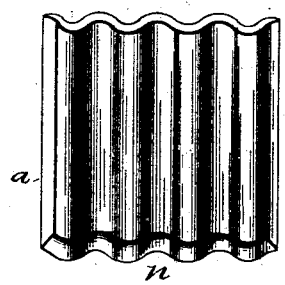
Figure 4:
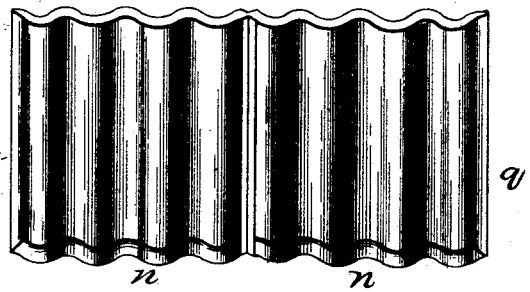
Figure 5:
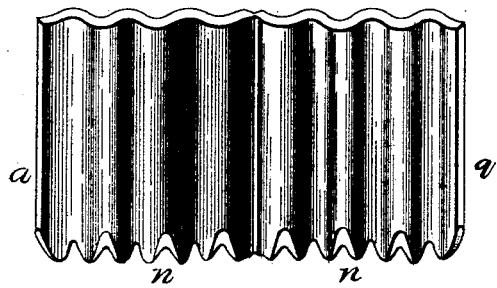
Figure 6:
Figures 7, 8:
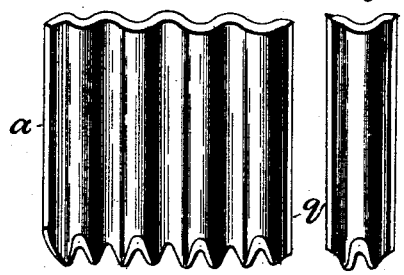

Figure 1 illustrates an uncorrugated metallic blank with side edges and with a sharpened entering edge. Fig. 2 is an end view of the same, showing the form of the sharpened side edges. Fig. 3 represents the same blank corrugated. Fig. 4 represents a number of fasteners only partially severed from the strip which they form. Fig. 5 is a view similar to Fig. 4, but in this case the entering edge is beveled to form straight cutting edges with intermediate draw-cutting edges. Fig. 6 is a bottom view of the fasteners shown in Fig. 5. Fig. 7 represents one of the fasteners separated or detached from the strip shown in Fig. 5. Fig. 8 shows a fastener of but one corrugation. Fig. 9 illustrates one method of acting upon the corrugated strip to form the sharpened side edges. Fig. 10 illustrates another method of accomplising the same end. Fig. 11 represents the plain blank being cut so as to form the sharpened side edges by means of shears working at an inclination to the blank. Fig. 12 represents the plain or uncorrugated material being drawn from a roll and passed through a pair of rolls which both corrugate the material and form the sharpened side edges. Fig. 13 represents an edge view of the plain or uncorrugated blank receiving its sharpened side edges by being passed between a plain and a severing roll. Fig. 14 represents a corrugated strip passing between a pair of severing rolls, and having the sharpened side edges formed on both sides of the strip. Fig. 14ª represents an enlarged section of a portion of the corrugated strip after it has passed through the roll. Fig. 15 represents the uncorrugated material passing through a series or gang of rolls in the process of forming the sharpened side edges. Fig. 15ª is a view of the strip thus formed, and Fig. 16 is a side view of the roll and strip.

Referring to the drawings, the letter $a$ represents the sharpened side edge of a fastener. This edge may be formed entirely from one side, or it may receive an extra beveled or sharpened edge as shown at $q$. The function of the side edge is to facilitate the entrance of the fastener into the wood or other material into which the said fastener may be driven, and to enable the fastener to be driven across the grain of woods without splitting the same. This it does because it cuts its way through the woods without rupturing the fibers. It separates the fibers, instead of rupturing them, and forms in effect an additional cutting edge. The blanks shown in Figs. 1 and 2 may be formed by passing a strip of material between dies or rollers to form the side edges $a$ and the entering edge $n$, and the blank thus formed may be corrugated as shown in Fig. 3. The metal blank may also be fed through corrugating rolls by which the individual fastener will not be entirely severed from the strip, the side edges $a$ being only partially formed; or the corrugated roll may cause the complete severance of the individual fastener. It is immaterial whether the side edges be sharpened from one side alone, or whether they be beveled to form a V-shaped point. The side edges of the fastener are usually parallel to each other. In Fig. 8, I have represented a fastener formed of a single corrugation, which is especially adapted for use as a nail.

As I consider the sharpened side edge a feature of very great importance, I have represented in Figs. 9 to 16, inclusive, some of the methods by which I may produce the same. In Fig. 9, the corrugated material is acted upon by the sharp pointed die 1, and the smooth faced die 2, while in Fig. 10, two sharp pointed dies, 3 and 4, are used. In Fig. 9, the sharpened side edge is formed from one side only, producing such an edge as is shown in Figs. 1 to 8 inclusive at $a$, while in Fig. 10, the sharpened side edge is formed on both sides, producing such an edge as is shown in Figs. 1 to 8 inclusive at $q$. In Fig. 11 the plain or uncorrugated material is acted upon by a pair of shears 5 and 6, which work at an inclination to the material. In Fig. 12 the uncorrugated material is drawn from the roll 7, and is passed between the two toothed rolls 8 and 9, the action of the rolls being both to corrugate the material, and form the sharpened side edges. In Fig. 13, the plain or uncorrugated material passes between a plain or smooth-faced roll 10, and a roll 11 having sharpened cutting portions projecting at intervals from its surface. In Fig. 14, the corrugated material passes between a pair of rolls 12 and 13, which are formed as roll 11. In this case the sharpened side edges are formed from both sides. As represented, the rolls are not placed close enough together to entirely separate the corrugated material, but only sufficient to partially separate the material, leaving the complete separation to be performed by the person who wishes to use the fastener. The strip of corrugated material partially severed is rolled upon a roll 14. In Figs. 15, 15ª and 16, I have shown the plain material passing between the series or gang of beveling rolls 15, smooth-surfaced, holding-down rolls 16, being placed between the cutting rolls. As may be seen from these different figures, I may form my sharpened side edge in a variety of ways.

I will now describe the form of entering edge illustrated in Figs. 5 to 8 inclusive. In my Patent No. 406,545, I have shown a fastener, the entering edge of which is composed of re-entering, draw-cutting edges intermediate between points. The draw-cutting edges of this fastener are formed by beveling the corrugated fasteners in such a manner that the said edges register with the corrugations. In my present form of entering edge, instead of having draw-cutting edges intermediate with points, I so arrange the beveling plane that obliquely arranged straight cutting edges alternate with the draw cutting edges. The length of the straight cutting edges depends upon the shape of the corrugations, and the extent to which the beveling is carried. The inclination of the sides of the re-entering, draw-cutting edges will also vary with the shape of the corrugations, and the inclination of the beveling plane. The straight cutting edges will usually be obliquely arranged with reference to the general direction of the fastener, but by properly arranging the beveling plane, they may be made parallel to the same. The entering edge may be made without previously forming a cutting edge on the blank, or said blank may be formed with a single or double beveled cutting edge.

The complete fastener as thus formed has proven itself to be very well adapted to the use for which it is intended. By sharpening the side edges, an advantage is gained which has previously been pointed out, and by forming the entering edge in the manner described, combining as I do the shearing cutting action of the re-entering draw-cutting edge with the cross-cutting action of the straight cutting portions of the edge, a still further and striking advantage is obtained.

Having thus fully described my invention, what I claim as new, and desire to secure by Letters Patent, is—

1. A corrugated metallic fastener provided with a sharpened entering edge, and with sharpened side edges.

2. A corrugated metallic fastener, the entering edge of which is formed of wide cutting edges substantially as described intermediate between re-entering, draw-cutting edges.

3. A corrugated metallic fastener, the entering edge of which is formed of obliquely arranged, straight cutting edges intermediate with re-entering, draw-cutting edges.

4. A corrugated metallic fastener, provided with sharpened side edges, and an entering edge formed of straight-cutting edges alternating with re-entering, draw-cutting edges.

FERDINAND W. STARR.

Witnesses:
OLIVER H. MILLER,
J. W. DRAKE.